(12) United States Patent
Zehnder et al.

(10) Patent No.: US 11,480,459 B2
(45) Date of Patent: Oct. 25, 2022

(54) DRIVE DEVICE FOR CARRYING AND OPERATING A LOCKABLE INSERTION UNIT IN A WEIGHING BALANCE

(71) Applicant: Mettler-Toledo GmbH, Greifensee (CH)

(72) Inventors: Marc Zehnder, Uster (CH); Aurelius Rindlisbacher, Uster (CH)

(73) Assignee: Mettler-Toledo GmbH, Greifensee (CH)

( * ) Notice: Subject to any disclaimer, the term of this patent is extended or adjusted under 35 U.S.C. 154(b) by 437 days.

(21) Appl. No.: 16/794,848

(22) Filed: Feb. 19, 2020

(65) Prior Publication Data

US 2020/0284642 A1 Sep. 10, 2020

(30) Foreign Application Priority Data

Mar. 7, 2019 (EP) ..................................... 19161286

(51) Int. Cl.
| | |
|---|---|
| *G01G 13/00* | (2006.01) |
| *G01G 13/02* | (2006.01) |
| *G01G 21/28* | (2006.01) |
| *G01G 13/24* | (2006.01) |

(52) U.S. Cl.
CPC ......... *G01G 13/003* (2013.01); *G01G 13/022* (2013.01); *G01G 13/24* (2013.01); *B01L 2200/028* (2013.01)

(58) Field of Classification Search
CPC .... G01G 21/28; G01G 21/286; G01G 13/003; G01G 13/022; G01G 13/24; B01L 2200/028
See application file for complete search history.

(56) References Cited

U.S. PATENT DOCUMENTS

| | | | |
|---|---|---|---|
| 8,042,711 B2 | 10/2011 | Luechinger et al. | |
| 8,299,375 B2 | 10/2012 | Lüchinger et al. | |
| 8,875,749 B2 | 11/2014 | Nufer et al. | |
| 2019/0376836 A1* | 12/2019 | Zehnder | G01G 21/286 |
| 2020/0284645 A1* | 9/2020 | Zehnder | G01G 17/06 |

\* cited by examiner

*Primary Examiner* — Randy W Gibson
(74) *Attorney, Agent, or Firm* — Standley Law Group LLP; Jeffrey S. Standley; Stephen L. Grant

(57) ABSTRACT

A drive device (125) is adapted for use in combination with a weighing balance (100). The drive device has a receiving unit (130), an insertion unit (U) and a locking unit (140). The receiving unit is configured to receive the insertion unit. The locking unit is movable between a locking position, in which the insertion unit is constrained from movement, and an unlocking position, in which the movement is not constrained. The locking unit is coupled to the receiving unit in a biasing manner to predispose the locking unit into the locking position. The locking unit is slidably engaged with the receiving unit to allow the locking unit to slide relative to the receiving unit when an external force is applied to move the locking unit into the unlocking position.

13 Claims, 7 Drawing Sheets

DRIVE DEVICE FOR CARRYING AND OPERATING A LOCKABLE INSERTION UNIT IN A WEIGHING BALANCE

CROSS-REFERENCE TO RELATED APPLICATIONS

This application claims the benefit of priority to European patent application 19161286.0, filed on 7 Mar. 2019, which is incorporated by reference as if fully recited herein.

TECHNICAL FIELD

The invention concerns a drive device configured to receive and carry an insertion unit. By way of an arrangement, the drive device contains a receiving unit and a locking unit, both of which interact with the insertion unit.

BACKGROUND ART

The concept of using a drive device for carrying and operating an insertion unit such as a dosage-dispensing device in a weighing balance belongs to the known state of the art. The drive device contains a shaft that is connectable to the insertion unit for operating said insertion unit. This arrangement can be found typically in balances used in laboratories and such similar environments. For example in U.S. Pat. No. 8,042,711 B2, a receiving device implemented on a laboratory weighing balance is disclosed, in which any insertion unit can be exchanged simply and quickly. The insertion unit contains an adapter that establishes a mating relationship with the receiving device. The known arrangement discloses a locking element arranged to slide in a linear path for locking the insertion unit into place after it is seated on the receiving device. The insertion unit is locked in place when the shaft of the drive device is lowered to connect and operate the insertion unit. As the shaft advances downwards, the mechanism connecting the shaft and the locking element induces the locking element to simultaneously slide in a linear path until the span of the locking element is fully outside to constrict the insertion unit in its seated position.

In the foregoing example, the operation of the locking element is inherently dependent on the position and movement of the shaft. This arrangement requires the shaft to be operated each time the insertion unit is to be locked and/or unlocked from the receiving device. The prior art locking element and the corresponding mechanism are useful in case the insertion unit is a dosage-dispensing unit or a stirrer that requires power transfer from the shaft for its functioning. In case the insertion unit is a heating coil or a sensor, operating the shaft in the drive device for locking and unlocking is time consuming and is of no consequence. Advancing or retreating the shaft requires a motorized operation, which is energy consuming and prone to repair and replacement from time to time.

The object of the present invention is to simplify the insertion and removal of an insertion unit into and from the receiving unit, respectively. This task is solved by a weighing balance according to the independent claim 1. Advantageous embodiments and detail features of the invention are set forth in the dependent claims.

SUMMARY OF INVENTION

A drive device adapted to be used in combination with a weighing balance is disclosed. A drive device contains a receiving unit that is configured to receive an insertion unit. The drive device further contains a locking unit that is movable between a locking position and an unlocking position. In the locking position of the locking unit, the movement of insertion unit is constrained. On the contrary, in the unlocking position of the locking unit, the movement of insertion unit is unconstrained. In the inventive arrangement, the locking unit is biasingly coupled to the receiving unit for predisposing the locking unit into the locking position. In addition, the locking unit is arranged to slidably engage with the receiving unit. This arrangement allows the locking unit to slide relative to the receiving unit upon application of external force for moving the locking unit into the unlocking position. The principal advantage of the inventive arrangement is the ease with which the insertion unit can be inserted into and removed from the receiving unit. The biased coupling of the locking unit to the receiving unit tends to predispose the locking unit into the locking position, which is desirable to secure the insertion unit once it is inserted into the receiving device. The sliding relationship between the locking unit and the receiving unit allows the locking unit to toggle between the locking and unlocking positions.

In the preferred embodiment, the insertion unit is configured to be inserted in as well as removed from the receiving unit. The insertion unit in the instant invention is a dosage dispensing unit for dosing the substances in solid or fluid form. Alternatively, the insertion unit is also a titration unit, a pump unit, a unit with pipe conduits and armatures, a container unit, a sensor unit, a heating and/or cooling unit or an adapter serving to receive one of said units or to receive further units. The advantageous arrangement allows a variety of devices to be used on the weighing balance without the need to modify the existing insertion units.

In the preferred embodiment of the weighing balance according to the invention, the drive device further contains a housing. The locking unit and the receiving unit are arranged inside the housing. The housing of the drive device includes at least one window, and a plurality of narrow slots. There is also provided an opening in the housing. The receiving unit and the locking unit are successfully packaged and secured inside the housing.

In an advantageous embodiment, the locking unit is received and accessed for operation through the at least one window and the opening. Similarly, the receiving unit is received in the plurality of narrow slots. The at least one window is arranged at a convenient location on the drive device for easy accessibility and operation. The at least one window on the housing accommodates that portion of the locking unit with which the operator of the weighing balance interacts for locking and/or unlocking the insertion unit. The opening on the housing accommodates that portion of the locking unit that interacts with the insertion unit for locking and/or unlocking it.

Preferably, the receiving unit contains a cover plate and at least two longitudinal frames releasably mated with the cover plate. Each of the longitudinal frames contains a plurality of support arms. The support arms are arranged substantially parallel to each other. In an operating state of the weighing balance, the support arms are useful in receiving and supporting the insertion unit as well as in holding it in position against the force of gravity.

In the preferred embodiment, the narrow slots are configured to receive the plurality of support arms. The portion of the receiving unit other than the support arms remains secured inside the housing of the drive device. The support arms pass through the narrow slots and extend outside the housing. The support arms cooperate with the insertion unit and hold the insertion unit at a designated position.

Preferably, the locking unit is integrally formed as a single unit having various portions. The locking unit includes a frame that forms the central or core of the locking unit. The locking unit also includes a latching portion, an actuating portion, a locating portion, a displacing portion, and a deforming portion. Each of the portions in the locking unit contribute uniquely to a specific function during operation. For example, the latching portion received in the opening of the housing is arranged to slide linearly in a fore and aft direction through the opening. The latching portion locks or unlocks the insertion device after it is received in the receiving arms of the receiving unit. Similarly, the locating portion aids in locating the locking unit on the receiving unit.

In a preferred way, the deforming portion is arranged to interact with the cover plate of the receiving unit. More specifically, the deforming portion biasingly couples the locking unit to the receiving unit. The deforming portion predisposes the locking unit, particularly the latching portion, into the locking position. Upon application of external force, the deforming portion interacts with the cover plate by undergoing deformation in its form and moves the locking unit into the unlocking position. As soon as the external force is removed, deforming portion regains its form thereby restoring the locking unit back into its locking position.

In the preferred embodiment, the actuating portion is received in the at least one window provided on the housing. The actuating portion transfers the external force acting on it on to the latching portion allowing the locking unit to slide relative to the receiving unit thereby moving the locking unit into the unlocking position.

In the preferred embodiment, the drive device is attachable to a weighing chamber rear wall of a weighing balance. By way of this attachment, the drive device is mountable on the weighing balance.

In an advantageous embodiment, the weighing chamber rear wall contains an elongate slot for receiving the drive device. Additionally, the elongate slot is envisaged to offer the advantage of guiding the drive device along the weighing chamber rear wall.

Preferably, the weighing balance further contains a weighing chamber floor. The weighing chamber rear wall contains a base module and a top module. The base module is connected to the weighing chamber floor and the top module is connected to the base module. In a preferred arrangement, the top module is positioned above the base module. Both the base module and the top module are positioned in an upright condition in relation to the weighing chamber floor. In an advantageous embodiment of this invention, the elongate slot is provided on the top module. The modular configuration of the weighing chamber rear wall serves to improve the flexibility of the weighing balance. The modular weighing chamber rear wall allows the positioning of the drive device at different heights above the weighing chamber floor of the same weighing balance.

In the preferred embodiment of the weighing balance according to the invention, there is provided a draft shield with a top wall. The top wall of the draft shield contains an opening. The opening in the top wall is configured to cooperate with the insertion unit carried by the drive device. This opening is sufficiently large enough to introduce test substance or instruments into the space surrounded by the draft shield and the weighing chamber rear wall.

With a weighing balance according to the invention, the operation of attaching the insertion unit to the receiving unit is accomplished by the following sequence of steps: selecting the insertion unit capable of performing a desired function;

applying the external force on the locking unit so as to move the locking unit from the locking position to the unlocking position; inserting the insertion unit into the receiving unit by moving the insertion unit in the direction of gravity such that in an operating state of the weighing balance the receiving unit is configured to support the insertion unit against the force of gravity; releasing the external force on the locking unit so as to move the locking unit from the unlocking position to the locking position; operating the insertion unit and performing the desired function;

applying the external force on the locking unit so as to move the locking unit from the locking position to the unlocking position; removing the insertion unit from the receiving unit by moving the insertion unit in the direction opposing the direction of gravity; releasing the external force on the locking unit to move the locking unit from the unlocking position to the locking position.

The preferred method allows the use of existing insertion units without the need for any special modifications or changes in their design. The locking unit of the drive device offers a unique advantage in that the locking unit remains in locking position by default because of the biasing interaction between the locking unit and the receiving unit. The operator of the weighing balance need only to apply external force for moving the locking unit from locking position into unlocking position. The locking unit regains its default locking position as soon as the external force is released, which further adds to its ease of operation.

The external force on the locking unit is applied by a human hand, by a gripping tool, or by the use of a programmable robotic arm. The locking unit works equally effectively in all the aforementioned forms of external force application. The process of inserting and removing the insertion unit involves movement of the insertion unit in x, y, or z directions, which is made easier to perform by the application of the aforementioned sequence of steps, especially when a gripping tool or a robotic arm is used.

BRIEF DESCRIPTION OF DRAWINGS

A weighing balance with the inventive arrangement of the drive device including the receiving unit and the locking unit will be described hereinafter through embodiments illustrated in the drawings, wherein.

DESCRIPTION OF EMBODIMENTS

Figure 1:
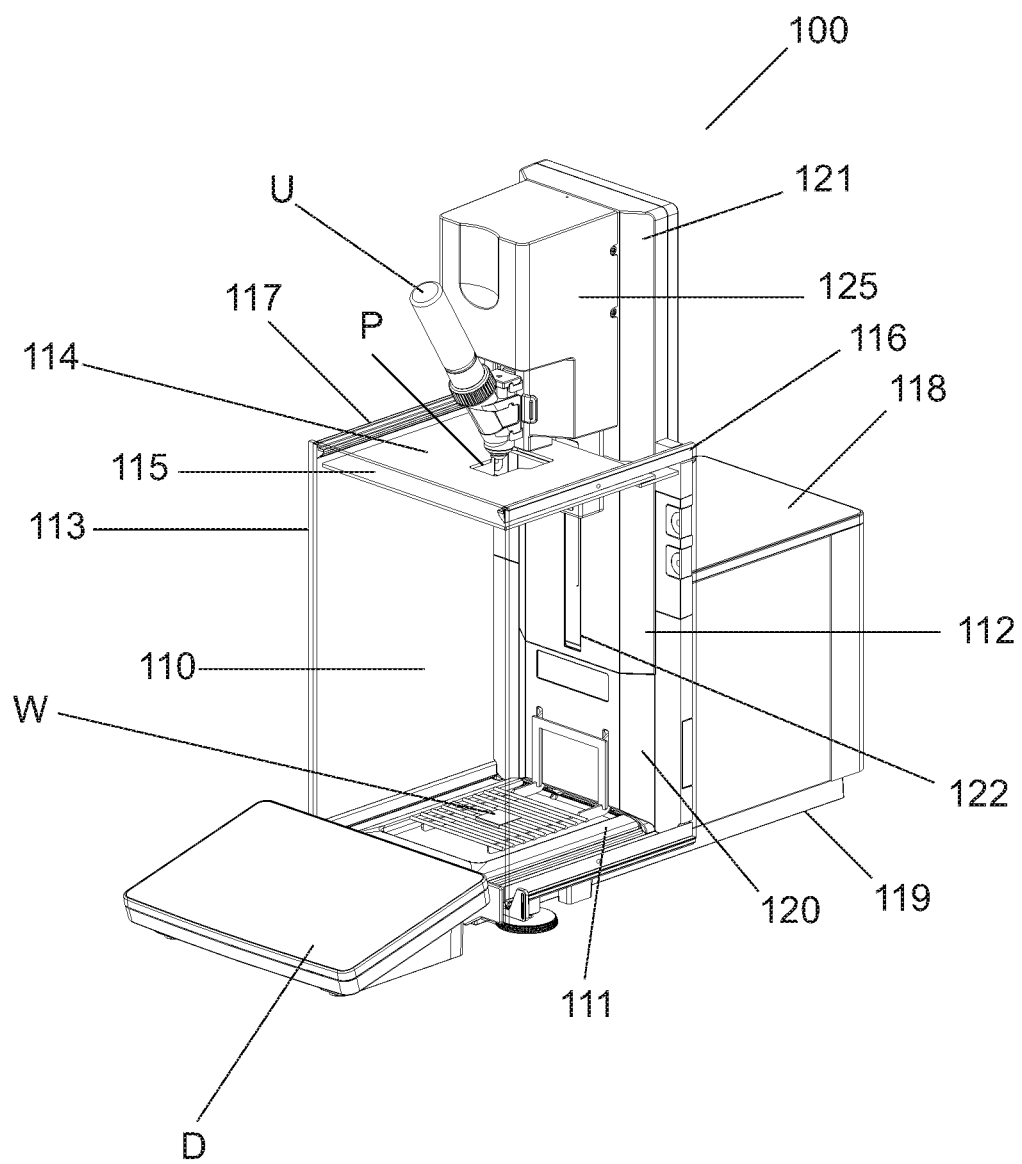
FIG. 1 illustrates an exemplary weighing balance with a drive device and an insertion unit that is attached to the receiving unit of the drive device.

FIG. 1 illustrates a weighing balance 100 according to the invention in a three-dimensional view. The principal parts of the weighing balance 100 are the display unit D, the weighing chamber 110, load cell housing 118, the base body 119, and the drive device 125. The weighing pan W, shown here in the form of a grate-shaped platform is fully enclosed inside the weighing chamber 110. The weighing chamber 110 is delimited against the ambient space by transparent wall panels of a draft shield 113, against the load cell housing 118 by the weighing chamber rear wall 112, and against the base body 119 by the weighing chamber floor 111. The weighing chamber 110 is enclosed at the top, front, and sides by the corresponding draft shield walls 114, 115, 116, and 117 respectively, at the backside by the weighing chamber rear wall 112, and at the bottom by the weighing chamber floor 111. The weighing chamber rear wall 112 is of modular construction, with a base module 120 and a top module 121. The drive device 125 is fixedly connected to the weighing chamber rear wall 112 so as to position the drive device 125 at a specific predetermined location away from the weighing chamber floor 111. The weighing chamber rear wall 112 contains an elongate slot 122 extending in the longitudinal direction. In one alternative arrangement, the drive device 125 is movably connected to the weighing chamber rear wall 112 allowing the drive device 125 to be guidable along the elongate slot 122. In the exemplary weighing balance 100, the drive device 125 is positioned above the top wall 114 of the draft shield 113. In one preferred arrangement, the top wall 114 and the drive device 125 are interconnected to allow the duo to move in tandem. The top wall 114 has an opening P that provides the insertion unit U access to the weighing chamber 110. The drive device 125 carries an insertion unit U, which is a dosage dispensing unit for dosing the substances in powder or paste form in the instant embodiment. However, the insertion unit U can be a titration unit, a pump unit, a unit with pipe conduits and armatures, a container unit, a sensor unit, a heating and/or cooling unit or an adapter serving to receive one of said units or to receive further units.

Figure 2:
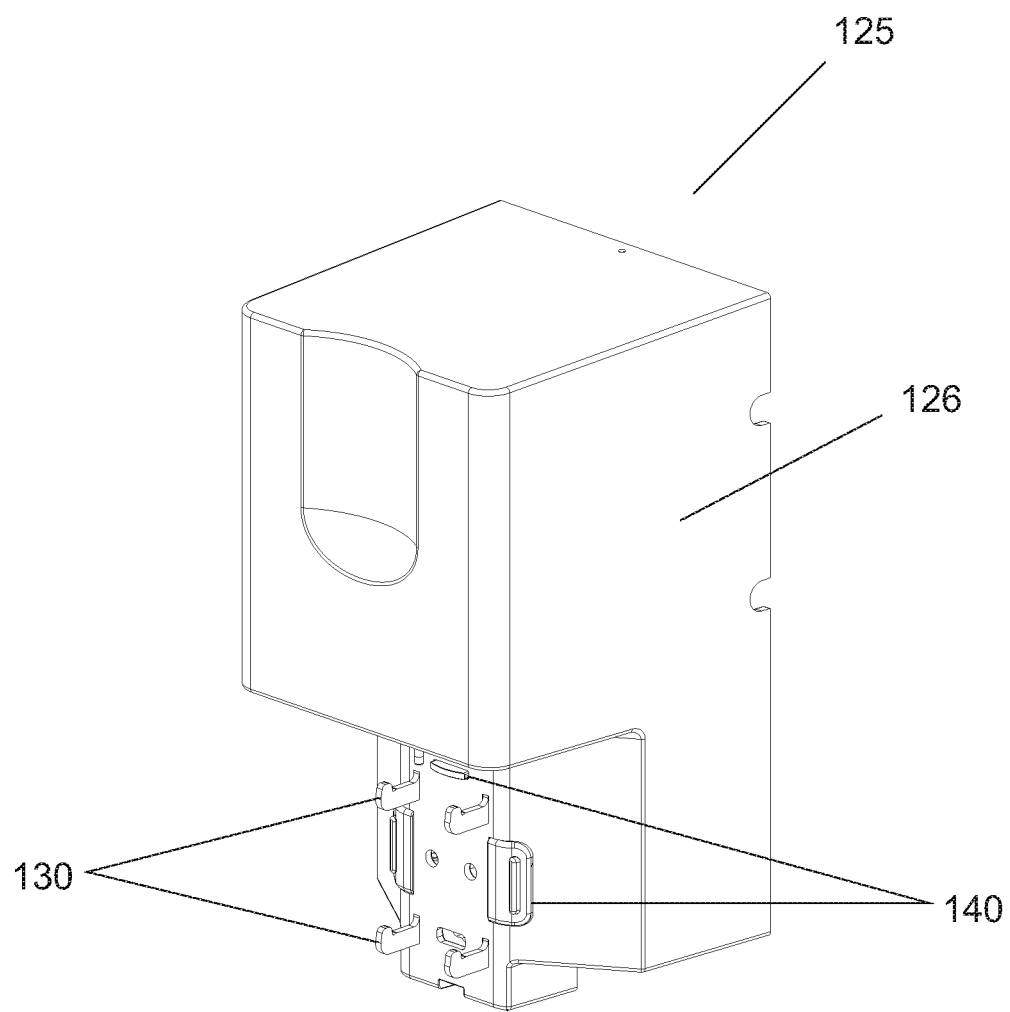
FIG. 2 illustrates the drive device with a receiving unit and a locking unit.
Figure 3:
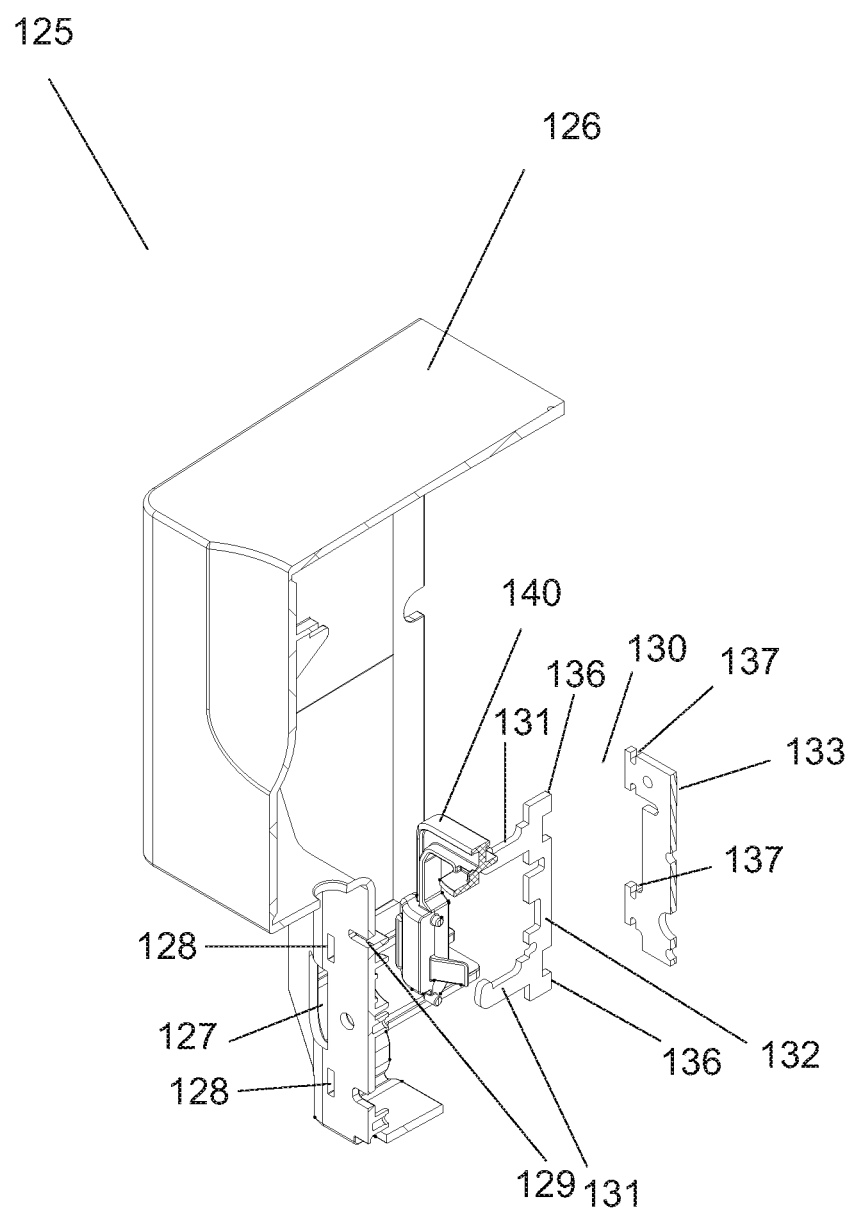
FIG. 3 is an exploded cross-sectional illustration of the drive device of FIG. 2 showing the receiving unit and the locking unit.

FIG. 2 and FIG. 3 show, respectively, the perspective and cross-sectional views of the drive device 125 without the insertion unit U. The drive device 125 has a receiving unit 130 and a locking unit 140, which are both located in the same plane. The receiving unit 130 and the locking unit 140 are arranged in the housing 126. Specific features of the housing 126 that are relevant to the invention include a pair of windows 127 provided on either side of the housing 126, a plurality of narrow slots 128, and an opening 129. The narrow slots 128 are provided substantially parallel to each other and extend in the longitudinal direction of the housing 126 flanked by the windows 127 with one on each side. The opening 129 is provided above the narrow slots 128. The receiving unit 130 includes two longitudinal frames 132 and the cover plate 133. Each of the longitudinal frames 132 has a pair of mounting tabs 136 that mate with recesses 137 provided on the cover plate 133 there by forming an assembly. Other features of the receiving unit 130 will be explained further in detail in the ensuing description.

Figure 4:
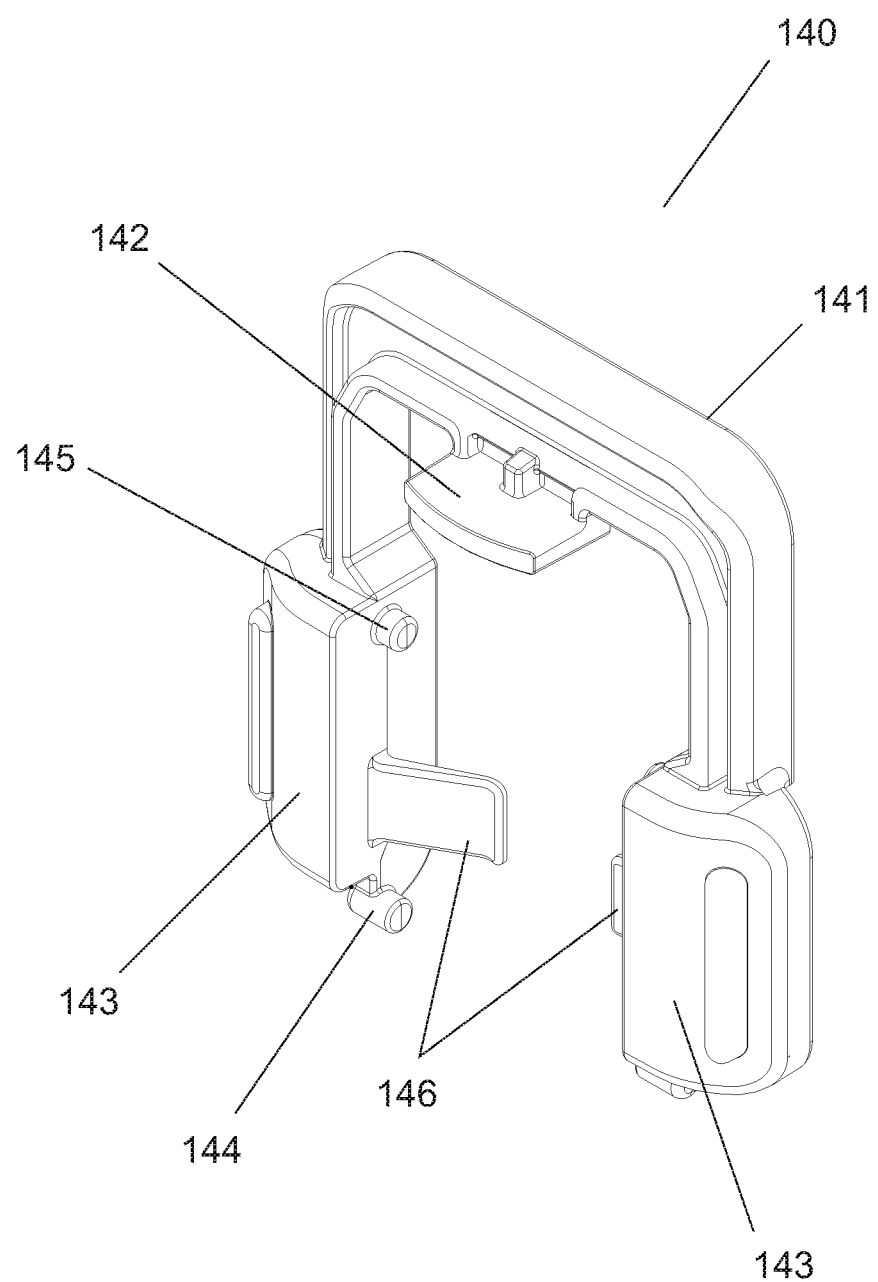
FIG. 4 illustrates a perspective view of the locking unit that is integrally formed.

FIG. 4 shows the locking unit 140 of the drive device 125 in a perspective view. As shown in the drawing, the locking unit 140 is formed as an integral unit having several portions each with a specific configuration and function. The main elements of the locking unit 140 are the frame 141 having an inverted-U configuration with two free ends located opposing each other, the latching portion 142 extending outwardly in the lateral direction from the central region of the frame 141, the actuating portion 143, the locating portion 144, the displacing portion 145, and the deforming portion 146. In the exemplary locking unit 140 shown in FIG. 4, the actuating portion 143, the locating portion 144, the displacing portion 145, and the deforming portion 146 exist in pairs with one each on the opposing ends of the frame 141. In an alternative way of realizing this invention, the actuating portion 143 is envisaged in a single form instead of existing in pairs. The actuating portion 143 is located on each of the opposing ends of the frame 141. The actuating portion 143 is profiled in the form of knobs that distend out of the windows 127 of the housing 126 when the drive device is in a fully assembled condition. The latching portion 142, similarly, protrudes out of the opening 129 of the housing 126 in a fully assembled condition of the drive device 125. The locating portion 144 in the form of a pair of protruding pins extending towards each other in the lateral direction to the frame 141 is positioned below the actuating portion 143. The displacing portion 145 assumes the form of a pair of pins extending inwardly in the lateral direction to the frame 141 and is positioned above the locating portion 144. The deforming portion 146 in the form of a pair of flexible tabs extending inwardly in the lateral direction to the frame 141 is positioned in between the locating portion 144 and the displacing portion 145.

Figure 5A:
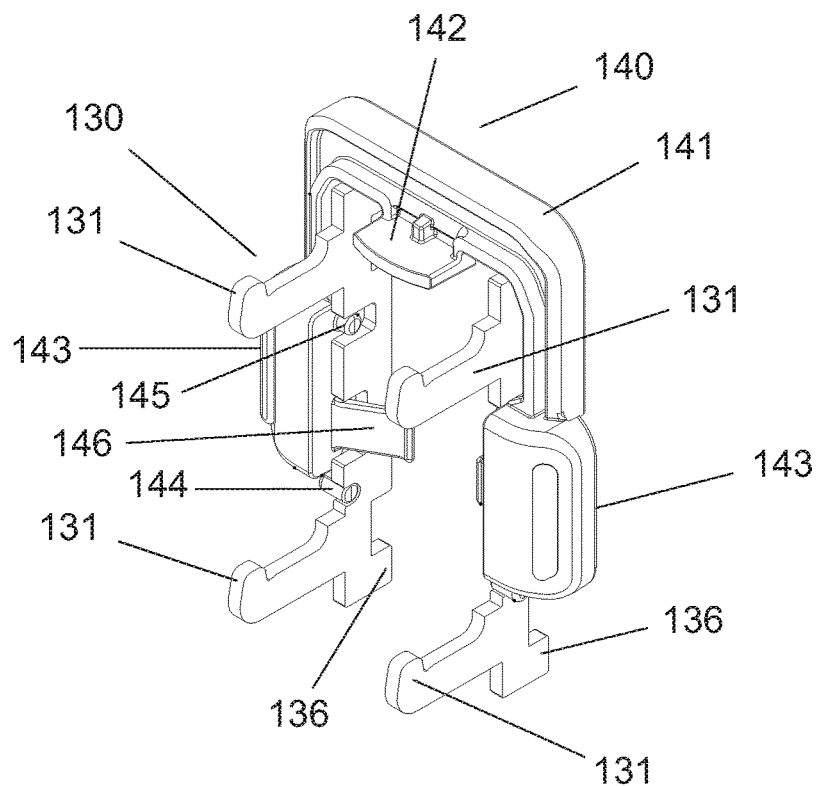
FIG. 5A illustrates a perspective view of an assembly containing the locking unit slidably engaged with the receiving unit.
Figure 5B:
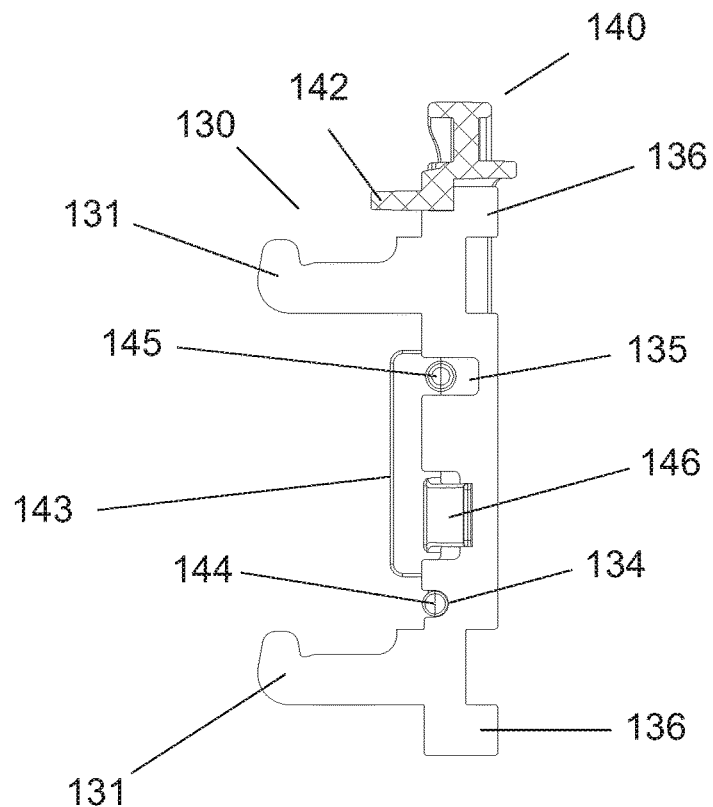
FIG. 5B illustrates a side-sectional view of an assembly of FIG. 5A.

FIGS. 5A and 5B show, respectively, a perspective view and a side view of an assembly containing the locking unit 140 slidably engaged with the receiving unit 130. Further elements of the receiving unit 130 are the locating recess 134 and the displacing recess 135. The locating recess 134 is configured to receive and firmly hold the locating portion 144 of the locking unit 140 in place. The displacing portion 145 of the locking unit 140 cooperates with the displacing recess 135 thereby allowing the locking unit 140 to linearly slide fore and aft in a plane perpendicular to the direction of gravity, when an external force is applied on the actuating portion 143.

Figure 6:
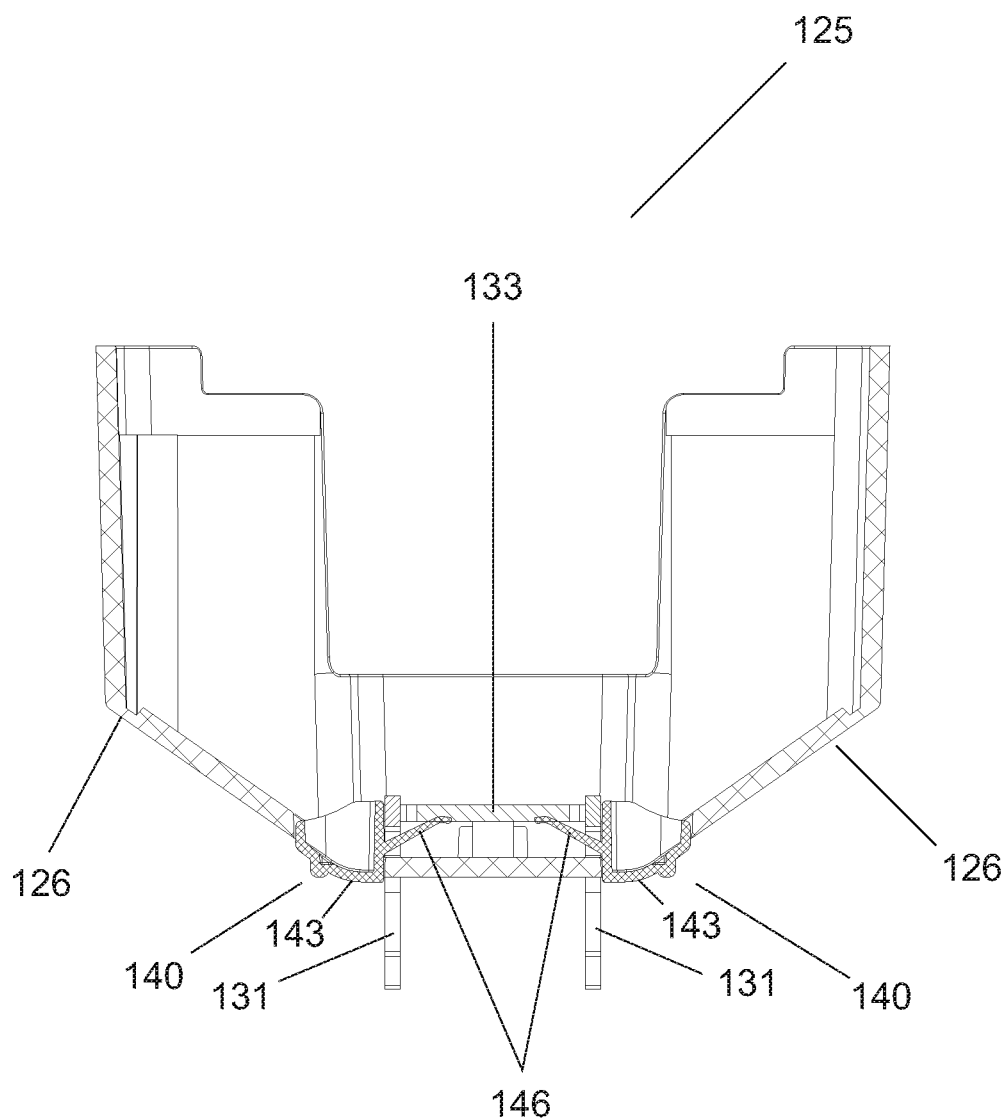
FIG. 6 illustrates a top-sectional view of the drive device of FIG. 2 showing the locking unit biasingly coupled to the receiving unit.

FIG. 6 illustrates a top sectional view of the drive device 125 showing the arrangement of receiving unit 130 and the locking unit 140. More particularly, the figure shows the interactive arrangement of deforming portion 146 of the locking unit 140 against the cover plate 133. The deforming portion 146 is flexibly formed and arranged to rest against the cover plate 133. Application of external force on the actuating portion 143 induces stress into the deforming portion 146 making the deforming portion 146 flex inwardly against the cover plate 133. Releasing the external force releases the stress in the deforming portion 146 making the deforming portion 146 retreat outwardly against the cover plate 133 thereby restoring its normal configuration.

Figure 7A:
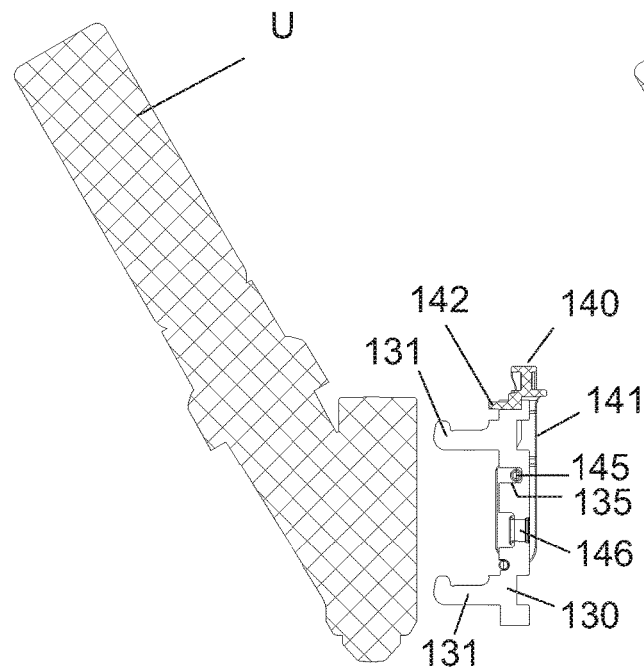
FIG. 7A illustrates the locking unit in unlocking position with the insertion unit not received in the receiving unit.

FIGS. 7A-7D illustrate the sequence of motions for attaching the insertion unit U to the receiving unit 130 of the drive device 125:

In FIG. 7A, appropriate insertion unit U is selected for attaching it to the receiving unit 130. The locking unit 140 and more specifically, the latching portion 142 of the locking unit 140 is moved into unlocking position by the application of external force on the actuating portion 143 by a human hand, by a gripping tool, or by a programmable robotic arm. As the locking unit 140 is integrally formed, the external force acting on the actuating portion 143 induces stress into the deforming portion 146 while simultaneously also moves the displacing portion 145 of the locking unit 140 inside the displacing recess 135.

Figure 7B:
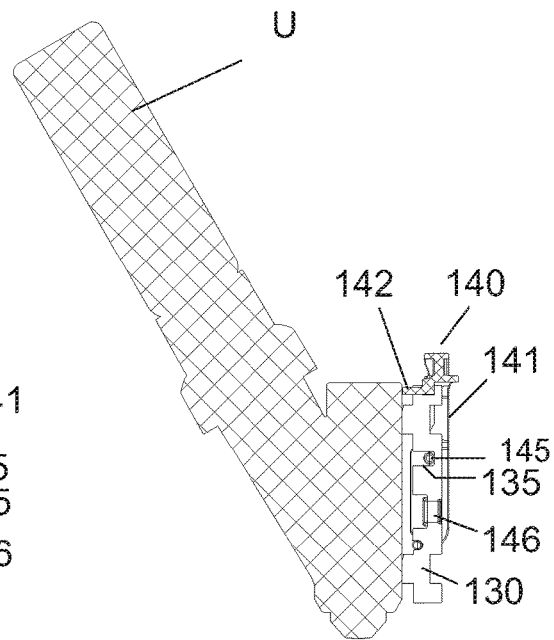
FIG. 7B illustrates the locking unit in unlocking position with the insertion unit partially received in the receiving unit.

In FIG. 7B, the latching portion 142 of the locking unit 140 remains in unlocking position and the insertion unit U is in alignment with the receiving unit 130 for attachment. More particularly, the insertion unit U is partly received on the support arms 131 of the receiving unit 130.

Figure 7C:
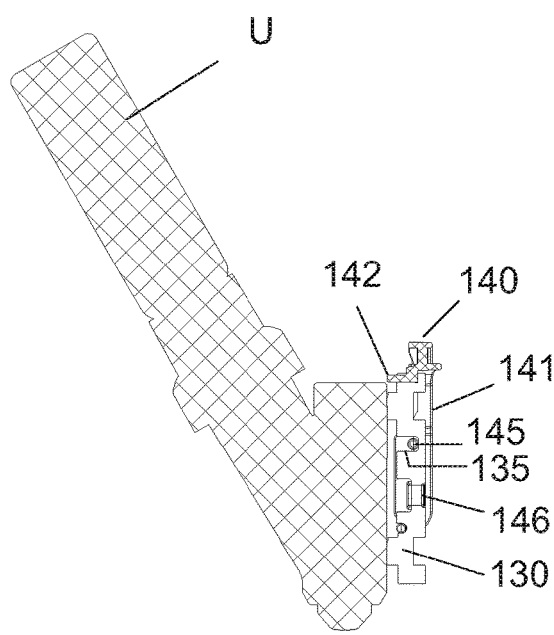
FIG. 7C illustrates the locking unit in unlocking position with the insertion unit fully received in the receiving unit.

In FIG. 7C, the latching portion 142 continues to remain in unlocking position while the insertion unit U is fully received and seated on the support arms 131 of the receiving unit 130. In FIGS. 7A to 7C, the displacing portion 145 has reached the innermost point of the displacing recess 135 indicating that the latching portion 142 of the locking unit 140 is in a fully unlocking position.

Figure 7D:
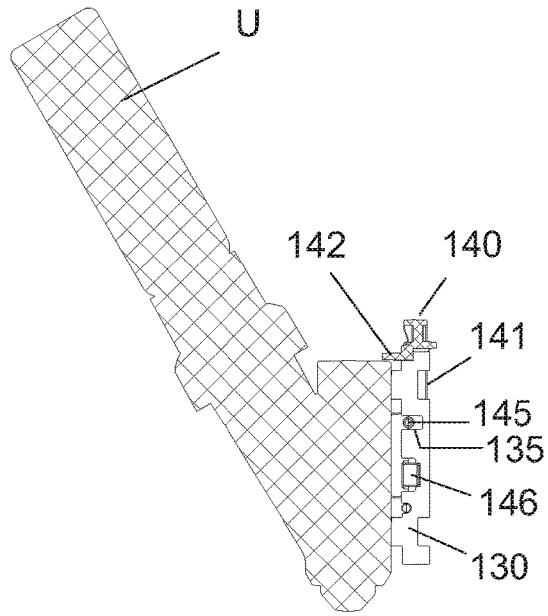
FIG. 7D illustrates the locking unit in locking position with the insertion unit fully received in the receiving unit and constrained by the locking unit.

In FIG. 7D, the latching portion 142 of the locking unit 140 is moved into the locking position when the external force acting on the actuating portion 143 is released. The deforming portion 146, which hitherto was under stress regains its normal configuration and the latching portion 142 emerges through the opening 129 of the housing 126, there by locking the insertion unit U that is fully received on the support arms 131 of the receiving unit 130. The locking unit 130 through its latching portion 142 constrains the insertion unit U in the direction opposing the direction of gravity. In FIG. 7D, the displacing portion 145 has reached the outermost point of the displacing recess 135 indicating that the latching portion 142 of the locking unit 140 is in a fully locking position. The insertion unit U can be unlocked by simply reversing the order of the aforementioned steps i.e. by starting from the step demonstrated in FIG. 7D and proceeding all the way back to step shown in FIG. 7A by traversing through steps shown in FIG. 7C and FIG. 7B, respectively.

Although the invention has been described through the presentation of one specific embodiment of the inventive concept of locking an insertion unit in the form of a dosage dispensing device to the receiving unit of a drive device by means of a locking unit, it is considered self-evident that numerous additional variants are encompassed by the teachings of the present invention, including for example the use of any other type of insertion unit besides the dosage dispensing device, or realizing the inventive concept without the use of a draft shield and the accompanying top wall. It is also envisaged to mount the drive device on a support stand or a platform that is positioned near the weighing balance independently and operate the drive device to perform desired functions without compromising its efficacy. Similarly, the actuating portion of the locking unit is arrangeable on any other suitable and convenient location on the drive device. The actuating portion is configured to be operable either from the left hand side, or from the right hand side, or from both the sides simultaneously, with the operator of the weighing balance standing in front of the display unit. Such combinations and variations of the inventive arrangement of the receiving unit and locking unit are considered without exception to fall within the scope of protection that is hereby sought for the present invention.

What is claimed is:

1. A drive device for use with a weighing balance, the drive device comprising:
an insertion unit;
a receiving unit configured to receive the insertion unit;
a locking unit, movable between a locking position, in which the insertion unit is constrained from movement, and an unlocking position, in which the insertion unit is not constrained from movement, the locking unit being coupled in a biasing manner to the receiving unit to predispose the locking unit into the locking position, and being engaged in a sliding manner with the receiving unit to allow the locking unit to slide relative to the receiving unit when an external force is applied to move the locking unit into the unlocking position; and
a housing having at least a window, a plurality of narrow slots, and at least an opening, wherein the locking unit and the receiving unit are attached to the housing such that the locking unit is received and accessed for operation through the at least one window and the at least one opening; and the receiving unit is received in the plurality of narrow slots.

2. The drive device of claim 1, wherein:
the insertion unit is configured for both insertion into and removal from the receiving unit, the insertion unit being selected from the group consisting of: a dosage dispensing unit for dosing substances in solid or fluid form, a titration unit, a pump unit, a unit with pipe conduits and armatures, a container unit, a sensor unit, a heating and/or cooling unit and an adapter serving to receive either one the aforesaid units or further units.

3. The drive device of claim 1, wherein:
the receiving unit comprises a cover plate with at least two longitudinal frames releasably mated with the cover plate, each of the longitudinal frames comprising a plurality of support arms that are arranged substantially parallel to each other, such that, in an operating state of the weighing balance, the support arms are configured to support the insertion unit against a force of gravity.

4. The drive device of claim 3, wherein the plurality of narrow slots is configured to receive the plurality of support arms.

5. The drive device of claim 3, wherein:
the locking unit is integrally formed as a single unit that comprises a frame, a latching portion, an actuating portion, a locating portion, a displacing portion, and a deforming portion.

6. The drive device of claim 5, wherein the deforming portion of the locking unit is biasingly coupled to the cover plate for predisposing the locking unit into the locking position.

7. The drive device of claim 5, wherein the actuating portion is received and accessed for operation through the at least one window, and the latching portion is received and accessed for operation through the at least one opening of the housing; such that the actuating portion transfers the external force to the latching portion, sliding the locking unit relative to the receiving unit, thereby moving the locking unit into the unlocking position.

8. The drive device of claim 1, wherein the drive device is configured for attachment to a weighing chamber rear wall of the weighing balance.

9. The drive device of claim 8, wherein the drive device is guidable along an elongate slot provided on the weighing chamber rear wall.

10. The drive device of claim 1, wherein the insertion unit is configured to cooperate with a draft shield of the weighing balance, the cooperation occurring between an opening in a top wall of the draft shield.

11. A weighing balance, comprising:
a drive device according to claim 1.

12. A method for operating a drive device of claim 1, the method comprising the steps of:
- selecting an insertion unit of the drive device capable of performing a desired function;
- applying, to the locking unit, an external force to move the locking unit from the locking position to the unlocking position;
- inserting the insertion unit into the receiving unit, which is configured to support the insertion unit against the force of gravity that acts on the weighing balance when in the operating state;
- releasing the external force, allowing the locking unit to move from the unlocking position to the locking position, installing the insertion unit;
- operating the insertion unit, installed in the drive device, to perform the desired function;
- applying the external force on the installed locking unit to move the locking unit from the locking position to the unlocking position;
- removing the insertion unit from the receiving unit; and
- releasing the external force on the locking unit to move the locking unit from the unlocking position to the locking position.

13. The method of claim 12, wherein the external force is applied by a programmable robotic arm.

* * * * *